Patented Feb. 1, 1927.

1,615,843

UNITED STATES PATENT OFFICE.

LLOYD E. JACKSON AND HELEN E. WASSELL, OF PITTSBURGH, PENNSYLVANIA.

INSECTIFUGE.

No Drawing.     Application filed December 17, 1925.  Serial No. 76,094.

This application is in part a continuation of an application filed by us April 6, 1925, Serial No. 21,180.

Our invention consists in an insectifuge and in the method of using it to protect fibrous articles and particularly animal fiber, such as fur, feathers, wool, and fabrics made from wool, from the attacks of moths and moth larvæ. Our invention is the result of protracted investigation, experiment, and study, in the fields both of chemistry and of entomology.

We have discovered that certain cinchona alkaloids, including toxic substances related to them, and, more specifically, the quinine alkaloids, including quinidine, quinine, cinchonidine, cinchonine, quinoidine, cuprein, and their salts, and other derivatives, are potent, to a satisfactory degree for the end in view, and that without prejudice to the ordinary uses to which such articles are put.

Our research results indicate that all of the cinchona alkaloids and their derivatives have clothes moth repelling properties, some of them, viz, quinidine and its derivatives, being evidently more effective in this respect than others. It is possible to use not only a certain cinchona alkaloid or one of its derivatives for repelling clothes moth attack, but mixtures of two or more of the cinchona alkaloids or their derivatives may be used for the same purpose.

These alkaloids and their derivatives and salts are variously soluble; some in water, some in naphtha, and some in other solvents, and, accordingly, selection may be made, and application of the insectifuge to the material may be variously carried out. The material may be sprayed with the solution, or immersed or dipped in the solution. Incidentally to the cleaning of the material, the substance may be dissolved in the cleaning bath, or in a rinse bath following the cleaning operation, perhaps of water, perhaps of naphtha, and so the treatment for the practice of our invention may be incorporated with other usual treatment of the material to be protected.

Quinidine, a typical cinchona alkaloid is alkaline in solution and behaves as a diacidic base, forming two series of salts. For the purpose of studying the moth-repelling properties of quinidine, a number of these salts were prepared, some of them new. These salts were dissolved in suitable solvents and used to treat test-pieces of wool and other materials, by immersing and by spraying. Test pieces made in this manner were subjected to clothes moth attack in cupboards stocked with the insects. A typical example of one of these experiments is as follows:

Quinidine alkaloid was converted into quinidine oleate by dissolving the alkaloid in twice its weight of oleic acid. Quinidine oleate formed in this manner is very soluble in petroleum naphtha. Pieces of wool were treated with quinidine oleate dissolved in naphtha by immersing and then centrifuging and also by spraying. First, test pieces were prepared by treating them with a very dilute solution of quinidine oleate in naphtha, and these were attacked by the clothes moths in the test cupboards. New test pieces were prepared with a more concentrated solution of the quinidine oleate and placed in the moth cupboards. This procedure was continued until the concentration of quinidine was sufficient to protect the test pieces of wool from moth attack. In this manner it was discovered that a minimum concentration of approximately one ounce of quinidine as oleate per gallon of naphtha (1.0 per cent. solution) is adequately effective in repelling clothes moth attack in wool. Approximately 0.025 of an ounce of quinidine as oleate has been found to be effective as a moth-repellent when evenly distributed through each pound of wool treated by immersion or spraying.

It was also discovered that the same quantity of quinidine, in the form of other compounds besides oleate, is required to repel clothes moth attack. Many compounds of quinidine may be prepared to be soluble in many different solvents. Various compounds were made and tried for moth-repelling properties dissolved in such substances as water, alcohol, benzene, carbon tetrachloride, petroleum ether, petroleum naphtha, kerosene, etc. In order to obtain quinidine in solution in any particular solvent, it is requisite to form an appropriate salt. For instance, if an aqueous solution is desired, it may be obtained by preparing the quinidine as a hydrochloride; if a solution in naphtha is desired, the quinidine may be prepared as an oleate; if a solution in alcohol is desired, the quinidine may be prepared as a sulphate. So called "dry" solvents are (with dyeing and cleaning operations in mind) used on fabrics and fibrous material, including fur and feathers; they are of such character that they do not cause the fiber to swell, nor change its physical condition. These "dry" solvents include chlorinated hydrocarbons, benzene, petroleum naphtha, alcohol, acetone, and others.

We have discovered that the successful use of quinidine or any other of the cinchona alkaloids for repelling clothes moths depends on isolating the alkaloid desired and then preparing a particular salt that is highly soluble in a vehicle suitable for treating woolens, furs, feathers, etc. For obtaining the highest efficiency in the use of these clothes moth repelling solutions, the solutions must be of a definite strength, and this we have determined by experiment.

Quinidine oleate, or any other cinchona alkaloid oleate, can best be used in solution in an appropriate volatile solvent that kills moths and moth larvæ, as carbon tetrachloride or petroleum naphtha; this vehicle then evaporates leaving the repellent intimately distributed throughout the material treated.

The higher boiling petroleum distillates, such as special petroleum naphthas, we have found to be particularly advantageous as solvents for quinidine oleate when using it for repelling clothes moths. When woolen materials, etc., are immersed in such a solution, they are not altered in the way that they are when wet with water. Woolen materials do not shrink when wet with petroleum naphtha.

When woolen materials, etc., are sprayed with a petroleum naphtha solution of quinidine oleate, the naphtha readily wets the wool and spreads in a manner similar to the way kerosene does in a lamp wick. This property is decidedly advantageous in that the quinidine oleate in solution is thus carried into the seams of garments, and into parts of upholstered furniture, etc., that cannot be reached directly with the spray. After a broad investigation of solvents to find the one most suitable to use as a vehicle for quinidine oleate, a special heavy petroleum naphtha was found most practical.

We contemplate the use of cinchona alkaloid oleates in solution in a special naphtha in dry-cleaning plants, for treating wool, fur, feathers, etc., to make them immune from moth attack. Another field of application of the proper strength solution (approximately 1.0 per cent.) is for household consumption, where it would be applied by the housewife by means of a spray.

In a dry-cleaning plant, the invention may be practiced as follows. A solution of quinidine oleate in a special heavy naphtha is prepared by dissolving 200 ounces of quinidine in 200 ounces of oleic acid and then in turn dissolving this product in 100 gallons of suitable petroleum naphtha. Articles such as suits, woolen piece goods, coats, furs, feathers, etc., that are to be treated will be immersed in or sprayed with the solution. The proportions given in the foregoing formula are such as to afford a margin for assured effectiveness. A formula requiring a smaller amount of quinidine oleate will still be effective if 37 ounces of quinidine be reduced to oleate and then dissolved in 100 gallons of petroleum naphtha. The solution of the salt will be substantially a 10% solution. In the case of immersion the materials will be wet with the quinidine oleate solution, from which they will then be removed, centrifuged, and allowed to dry. We have found that sufficient quinidine oleate remains in material so treated, to repel clothes moth attack. Articles treated in this manner are not changed in appearance and are not objectionable from a dermatological standpoint. There is no foreign odor, color, dust, or other objectionable evidence of the treatment left in them.

Treatment by a similar process using a suitable quinidine alkaloid or other cinchona alkaloid compound in a suitable solvent can be used to prevent clothes moth attack in such articles as rugs, draperies, furniture, woolens, etc., before they are sold to the consumer, and in wool, fur and feather products in the course of manufacture.

The water-soluble salts of the cinchona alkaloids may be attached to textile fibers, fur or feathers in much the same manner as dyestuffs. For example, wool may be steeped in a hot bath of quinidine hydrochloride dissolved in water; the quinidine then exhausts itself onto or attaches itself to the wool in such a way that it is not easily removed by solvents in which it is ordinarily soluble. Treatment in this manner offers a means for permanently mothproofing materials subject to moth attack.

We have found that wool and fabrics made of wool, when treated in the manner described, are rendered immune; that the larva of the moth will not attack them, but will leave them, or, if unable to leave them, will die while still minute, and thus the material will be protected from damage.

Articles so treated are rendered immune for long and indefinite periods of time; our experiments have demonstrated long-continued protection, and it has not yet appeared what limit there may be to the duration of the time.

We claim as our invention:

1. The method herein described of rendering fibrous material moth-proof which consists in treating it with a solution of a salt of a cinchona alkaloid.

2. The method herein described of rendering fibrous material moth-proof which consists in treating it with a solution of a salt of a cinchona alkaloid in a solvent which with respect to the material is a dry solvent.

3. The method herein described of rendering animal fiber and articles formed of animal fiber moth-proof which consists in treating the material with a solution in petroleum naphtha of a salt of a cinchona alkaloid.

4. The method herein described of rendering animal fiber and articles formed of animal fiber moth-proof which consists in treating the material with a solution in petroleum naphtha of quinidine oleate.

5. The method herein described of rendering fibrous material moth-proof which consists in treating it with a solution of a salt of quinidine of one per cent strength as a minimum.

6. A preparation for the moth-proofing of fibrous material consisting of a solution of a salt of a cinchona alkaloid.

7. A preparation for the moth-proofing of fibrous material consisting of a solution of a salt of quinidine.

8. A preparation for the moth-proofing of fibrous material consisting of a solution of quinidine oleate in petroleum naphtha.

9. A preparation for the moth-proofing of fibrous material consisting of a solution of the strength of one per cent as a minimum of a salt of quinidine.

10. The method herein described of moth-proofing fibrous material which consists in bringing the fibrous material into association with a solution of a cinchona alkaloid derivative and causing the cinchona alkaloid derivative to attach itself to the fiber with an intimacy of attachment resistant to subsequent washing away.

11. The method herein described of moth-proofing fibrous material which consists in steeping the fibrous material in a solution of a cinchona alkaloid derivative, whereby the cinchona alkaloid derivative attaches itself to the fiber with an intimacy resistant to subsequent washing away.

12. The method herein described of rendering fibrous material moth-proof which consists in treating it with a solution containing a cinchona alkaloid.

13. A preparation for the moth-proofing of fibrous material consisting of a solution containing a cinchona alkaloid.

In testimony whereof we have hereunto set our hands.

LLOYD E. JACKSON.
HELEN E. WASSELL.